US012805482B2

(12) United States Patent
Lobue

(10) Patent No.: US 12,805,482 B2
(45) Date of Patent: Nov. 24, 2026

(54) ANIMAL BEDDING MADE FROM AGRICULTURAL WASTE

(71) Applicant: Lauren Lobue, Albuquerque, NM (US)

(72) Inventor: Lauren Lobue, Albuquerque, NM (US)

( * ) Notice: Subject to any disclaimer, the term of this patent is extended or adjusted under 35 U.S.C. 154(b) by 0 days.

(21) Appl. No.: 19/206,759

(22) Filed: May 13, 2025

(65) Prior Publication Data

US 2025/0344667 A1 Nov. 13, 2025

Related U.S. Application Data

(60) Provisional application No. 63/804,828, filed on May 13, 2025, provisional application No. 63/646,245, filed on May 13, 2024.

(51) Int. Cl.
*A01K 1/015* (2006.01)

(52) U.S. Cl.
CPC .................................. *A01K 1/0157* (2013.01)

(58) Field of Classification Search
CPC .............. A01K 1/0157; A01K 1/01577; A01K 1/0158; D04H 1/643
See application file for complete search history.

(56) References Cited

U.S. PATENT DOCUMENTS

| | | | | |
|---|---|---|---|---|
| 2012/0000428 | A1* | 1/2012 | Keating | A01K 1/0107 119/28.5 |
| 2019/0153286 | A1* | 5/2019 | Peterson | C08L 75/04 |
| 2022/0259478 | A1* | 8/2022 | Peterson | C08K 3/08 |

FOREIGN PATENT DOCUMENTS

| | | | | |
|---|---|---|---|---|
| EP | 2204483 A2 | * | 7/2010 | D04H 1/43835 |
| GB | 2452235 A | * | 3/2009 | D04H 5/04 |
| JP | 4125065 B2 | * | 7/2008 | D02G 3/04 |
| JP | 2009065913 A | * | 4/2009 | C09D 5/14 |
| JP | 2023532160 A | * | 7/2023 | D01C 1/02 |
| KR | 101654604 B1 | * | 9/2016 | E04B 1/76 |
| KR | 102480713 B1 | * | 12/2022 | D06N 3/0011 |
| WO | WO-2006076814 A1 | * | 7/2006 | C08L 97/02 |
| WO | WO-2010071945 A1 | * | 7/2010 | D21B 1/061 |
| WO | WO-2014107767 A1 | * | 7/2014 | B32B 21/02 |
| WO | WO-2021171172 A1 | * | 9/2021 | E01C 13/08 |
| WO | WO-2022236150 A1 | * | 11/2022 | C11D 17/042 |

* cited by examiner

*Primary Examiner* — Monica L Perry
*Assistant Examiner* — Aaron M Rodziwicz
(74) *Attorney, Agent, or Firm* — Kumar Prabhu Patel & Banerjee; Luis M. Ortiz; Kermit D. Lopez

(57) ABSTRACT

An animal bedding pad formed from banana fibers is disclosed. The banana fibers, derived from stalks of banana plants, are processed to remove impurities and pretreated to reduce microbial growth and tannin content. The fibers are arranged in a predetermined configuration corresponding to an application-specific footprint and are integrated into a cohesive pad by stitching using natural thread and/or application of a biodegradable bonding agent. The resulting pad is biodegradable and maintains structural integrity when exposed to moisture. Methods for manufacturing the pad include obtaining, processing, pretreating, arranging, integrating, and drying the banana fibers to form a durable, moisture-resistant bedding structure.

19 Claims, 6 Drawing Sheets

*Illustrative graph based on trends from third-party literature. Not derived from internal lab testing.*

ANIMAL BEDDING MADE FROM AGRICULTURAL WASTE

INVENTION PRIORITY

The present embodiments claim priority to provisional patent application Ser. No. 63/804,828, filed May 13, 2025, by Lauren Lobue for "Pads Made From Agricultural Waste." The present embodiments also claim priority to provisional patent application Ser. No. 63/646,245, filed May 13, 2024, by Lauren Lobue for "Evaporative Cooler Pads made from Banana Cellulose Fibers."

TECHNICAL FIELD

Embodiments are generally related to pads that can be used as bedding for animals. More particularly, embodiments are related to eco-friendly pads made from agricultural waste, such as banana crop fibers, for use in applications such as for animal and pet bedding.

BACKGROUND

Animal bedding is material which is applied in living quarters of animals/livestock for them to lay and sleep on. Its purpose is to keep farm animals/livestock comfortable, dry and clean. Bedding is not meant to act solely as a floor covering for your animals. Bedding should also provide them comfort and cushioning to create a good resting place, protect them from the cold and drafts and absorb moisture to keep them dry. Ensuring they have plenty of clean, fresh and comfortable bedding is one way to maintain your animal's health and hygiene. Examples of bedding include wood shavings, wood pellets, sawdust, sand, wood chips and newspaper.

Wood shavings (cedar shavings, pine shavings and aspen shavings) are a by-product of wood products. They come in different textures and are used for a variety of animals. Wood shavings are absorbent, easy to handle and clean up, have great odor control and are comfortable. However, they can be dusty and contain aromatic oils that can result in respiratory, urinary tract, gastrointestinal and skin disorders and other health problems in some animals. It's also crucial to be cautious since some woods, like cherry trees, can be toxic. Wood shavings are suitable for goats, horses, sheep, cows and poultry.

Wood pellets are made from compacted wood waste. They are highly absorbent, with excellent odor control and a consistent texture. Wood pellets are also compostable, and easy to transport and store, making them a popular bedding option among farmers. As bedding, pellets are suitable for poultry, horses, pigs and hamsters. Pellets, however, may not be as comfortable as textures and softness provided by other media.

Sawdust is another by-product of wood. It's finer than wood shavings, highly absorbent and easy to handle and clean since it clumps when it gets wet. One thing to note is that sawdust adheres to animals' coats creating soiled spots. It's essential to pay more attention when using sawdust since it can transmit bacteria and cause health problems. Sawdust is suitable for poultry and goats.

Sand provides high levels of comfort for animals. Due to the texture of sand, animals can make it conform to their shape and create a great place to rest. As an inorganic material, sand transmits bacteria less than other materials. On the downside, it isn't a good absorbent, can cause health problems when excrement builds up and isn't easy to dispose of. Sand is suitable for cows and goats.

Wood chips, another by-product of wood, are cheaper and require fewer layers. However, they are poor absorbents, are uncomfortable, create a damp environment that promotes bacterial growth and generates mildew and mold. It's not advisable to use moist wood chips as bedding since they emit a color that may stain the coat of the animals.

Shredded newspaper is a popular bedding option for animals. They are highly absorbent, sterile, long-lasting, environmentally friendly, weed and dust-free and decompose quickly. Newspaper bedding is suitable for sheep, cows and goats. Newspaper, however, is not as easy to source and other media for large applications or requirements.

Despite the current availability of bedding material in the art, there is still a growing need for more sustainable and environmentally friendly alternatives to traditional bedding materials.

SUMMARY OF EMBODIMENTS

It is ideal for the environment if agricultural waste could be repurposed. The present embodiments relate to the fields of animal bedding and media and sustainable materials, particularly in the development of plant-based pads utilizing bio-based binders, pretreatment methodologies, or manual fiber stitching techniques. Banana fibers are an example of such waste.

Banana crop fibers come from the outer sheath formed by the leaves that grow around the trunk of the plant. Sheaths can be cut into strips and fed into a machine to extract the fiber and remove the pulp. The fiber can then be dried in the sun, bundled, and sent for processing. While banana fibers have been used in various applications such as textiles and handicrafts, their adaptation for use in animal bedding requires a creative and inventive step. This step involves recognizing the unique properties of banana fiber, such as its high absorbency and durability, and applying them to solve the specific challenges associated with providing comfortable and safe bedding for animals (e.g., pets).

Banana fiber, an agricultural byproduct, presents a renewable material alternative but has historically been limited by its moisture retention, high tannin levels, and susceptibility to microbial growth. The present embodiments can address these limitations through two primary innovations. A pretreatment process can be implemented that improves the physical, microbial, and chemical profile of banana fiber. A natural construction system can be incorporated that maintains structural integrity and airflow performance either through a bio-based binding agent or through manual stitching with natural thread.

Banana fiber bedding represents a novel invention because they utilize banana plant fibers as the primary material. Unlike conventional pads made from synthetic foams, banana fiber pads are derived from a renewable and sustainable source that has not been previously used in this application. The use of banana fibers in the manufacture of bedding is environmentally friendly. Banana fiber pads are derived from a renewable and sustainable source that has not been previously used as the primary medium for bedding. The use of banana fiber offers unique advantages, such as higher absorbency, durability, and environmental sustainability, which distinguish these pads from existing solutions in the market. Embodiments disclosed herein provide a sustainable, biodegradable, and durable alternative to traditional animal bedding, offering significant advantages in terms of environmental impact, performance, and longevity.

In accordance with feature of the inventive embodiments, a banana fiber pad can be provided that includes banana fibers taken from the stalks of banana plants that have been processed to remove impurities and prepared them for use in pad formation by being laid out into a predetermined format to ensure proper coverage and density within a matching application size and footprint.

In accordance with feature of the inventive embodiments, a biodegradable bonding agent can be applied to the laid-out banana fibers. The banana fiber pad can be formed into a predetermined format to ensure proper coverage and density within a matching application size and footprint.

In accordance with another feature of the embodiments, provided is a sustainable, high-performance alternative to conventional bedding padding wherein a novel pretreatment process can be incorporated to reduce bacterial growth and tannin content and then can integrate a natural binding agent or a manual stitching method using natural thread. This can result in a structurally sound, odor-resistant, and environmentally friendly medium.

DETAILED DESCRIPTION

The present invention addresses the need for pads made from sustainable materials by introducing a novel method for manufacturing pads using agricultural waste such as banana fibers—a renewable and biodegradable material—which can be adapted for applications such as use for animal bedding. Banana fibers are mentioned as an example of a type of agricultural waste that can be repurposed as pads, but the embodiments and claims should not be interpreted as being limited to banana fibers and the only natural medium used, nor should the embodiments and claims be interpreted as a limit of pads produced herein only for use with animal bedding. Pads can also be utilized in applications, such as a media used for evaporative cooler pads, in landscaping, and to mitigate ground surface erosion.

Figure 1:
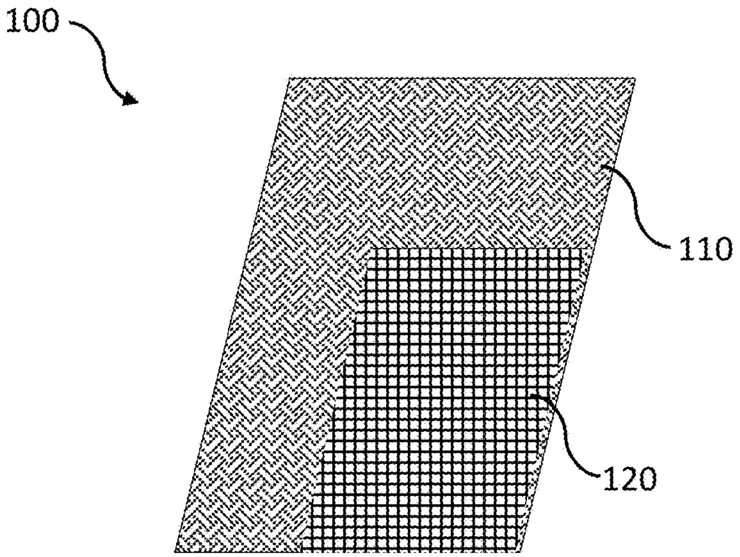
Referring to FIG. 1, illustrated is a top perspective drawings of a pad made from banana fibers.

Referring to FIG. 1, illustrated is a perspective view 100 of a banana fiber pad 110, in accordance with an embodiment. The banana fiber pad 110 is partially shown in the illustration to be treated with a biodegradable bonding agent 120 to form a cohesive structure that maintain its integrity even when subjected to moisture. Importantly, the bonding agent is carefully selected to ensure compatibility with the banana fibers and to prevent disintegration or degradation upon exposure to water.

Figure 2:
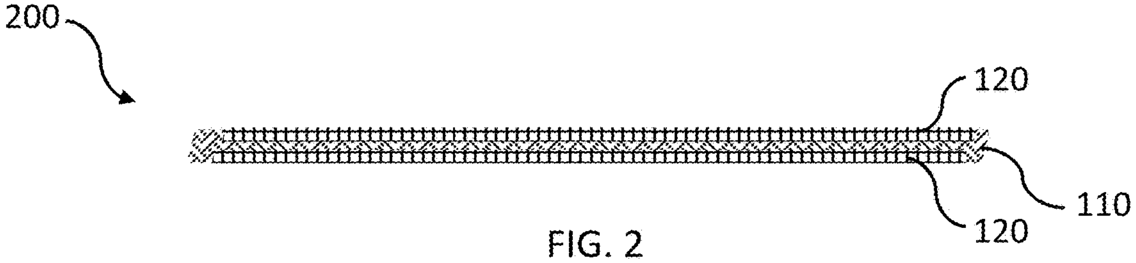
Referring to FIG. 2, illustrated is a side perspective of a pad made from banana fibers and including a bonding agent.

Referring to FIG. 2, illustrated is a side view 200 of the banana fiber pad 110 shown in FIG. 1. The banana fiber pad 110 is once again shown to be treated with biodegradable bonding agent 120.

Figure 3:
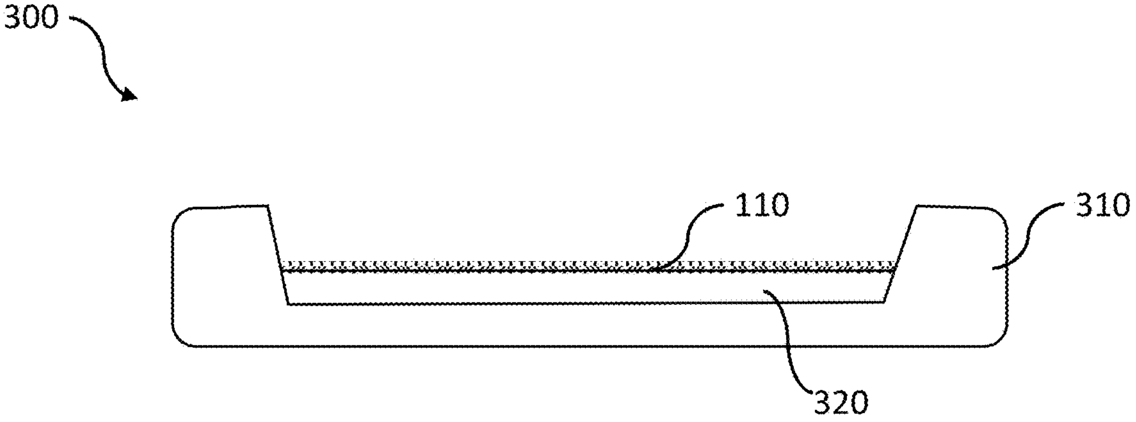
Referring to FIG. 3, illustrated is animal bedding utilizing fiber pads in accordance with the embodiments installed therein.

Referring to FIG. 3, illustrated is perspective view 300 of animal bedding, in accordance with an embodiment. Banana fiber pads can serve a purpose for animal beds or resting areas. For example, using pads 320 made from banana fibers 110 to line a pet's beds 310 or other areas can offer several benefits, including comfort, durability, and sustainability.

Here's how these banana fiber pads can be effectively utilized in animal care: Overall, using pads made from banana fibers to line beds or areas provides a comfortable, sustainable, and pet-friendly bedding solution. It offers numerous benefits for both pets and pet owners, contributing to a healthier and more environmentally conscious pet care routine.

1. Comfort and Insulation

- Banana fiber pads provide a soft and comfortable surface for pets to rest on. They offer cushioning and support, promoting better sleep quality for pets.
- The natural insulation properties of banana fibers help regulate temperature, keeping pets warm in colder weather and cool in warmer conditions.

2. Moisture Absorption

- Banana fibers have inherent moisture-wicking properties, absorbing excess moisture from fur or accidents. This helps keep the animal's sleeping area dry and odor-free.

3. Hypoallergenic and Non-Toxic

- Banana fibers are hypoallergenic and non-toxic, making them safe for pets with sensitive skin or allergies. They are free from harmful chemicals and additives commonly found in synthetic materials.

4. Durability and Longevity

- Banana fiber pads are durable and resistant to wear and tear. They can withstand scratching, digging, and nesting behaviors common in pets.
- The pads maintain their structural integrity over time, providing long-lasting comfort and support.

5. Biodegradability and Eco-Friendliness

- Banana fiber pads are environmentally friendly and biodegradable, making them a sustainable choice for pet bedding. They decompose naturally without leaving behind harmful residues or pollutants.
- After their usable life span, the pads can be composted or disposed of in an eco-friendly manner, reducing environmental impact.

6. Easy Maintenance

- Banana fiber pads are easy to clean and maintain. They can be spot cleaned with mild detergent and water or machine washed as needed. Air drying or low-heat drying is recommended to preserve the integrity of the fibers.

7. Customization and Design

Banana fiber pads come in various sizes and shapes to fit different bedding applications or resting areas. They can be easily trimmed or shaped to accommodate specific requirements.

Decorative elements or covers can be added to the pads to enhance aesthetics and match preferences for decor.

Biodegradable bonding agents that can be suitable for use in the manufacturing of pads made from banana fiber can include:

1. Starch-Based Adhesives: Starch-based adhesives, derived from sources such as corn, potato, or tapioca, are widely used in various industries due to their biodegradability and adhesive properties. These adhesives can effectively bind natural fibers together and are compatible with banana fiber.
2. Soy-Based Adhesives: Soy-based adhesives are derived from soybean proteins and offer excellent bonding properties. They are biodegradable, renewable, and exhibit good adhesion to natural fibers, making them suitable for use in eco-friendly applications.
3. Gelatin: Gelatin is a protein obtained from animal collagen, but there are also alternatives made from plant sources. It has adhesive properties and can be used as a bonding agent for natural fibers like banana fiber. Gelatin-based adhesives can provide strong bonds while being biodegradable.
4. Bio-Based Polyurethane: Bio-based polyurethane adhesives are derived from renewable resources such as vegetable oils or starch. They offer good adhesion to natural fibers and can provide durable bonds. These adhesives can be formulated to be biodegradable, making them suitable for environmentally friendly applications.
5. Lignin-Based Adhesives: Lignin is a natural polymer found in plants and is a byproduct of various industries such as paper and biofuel production. Lignin-based adhesives are being explored as eco-friendly alternatives due to their renewable nature and adhesive properties. They can be used to bond natural fibers together effectively.
6. Citrus-Based Adhesives: Adhesives derived from citrus fruits, such as orange or lemon peels, offer potential as biodegradable bonding agents. These adhesives contain natural compounds that can provide adhesive properties and are environmentally friendly.

Each of these bonding agents has its unique properties and advantages, and the selection would depend on factors such as cost, availability, compatibility with banana fiber, and desired performance characteristics in the pads.

Figure 4:
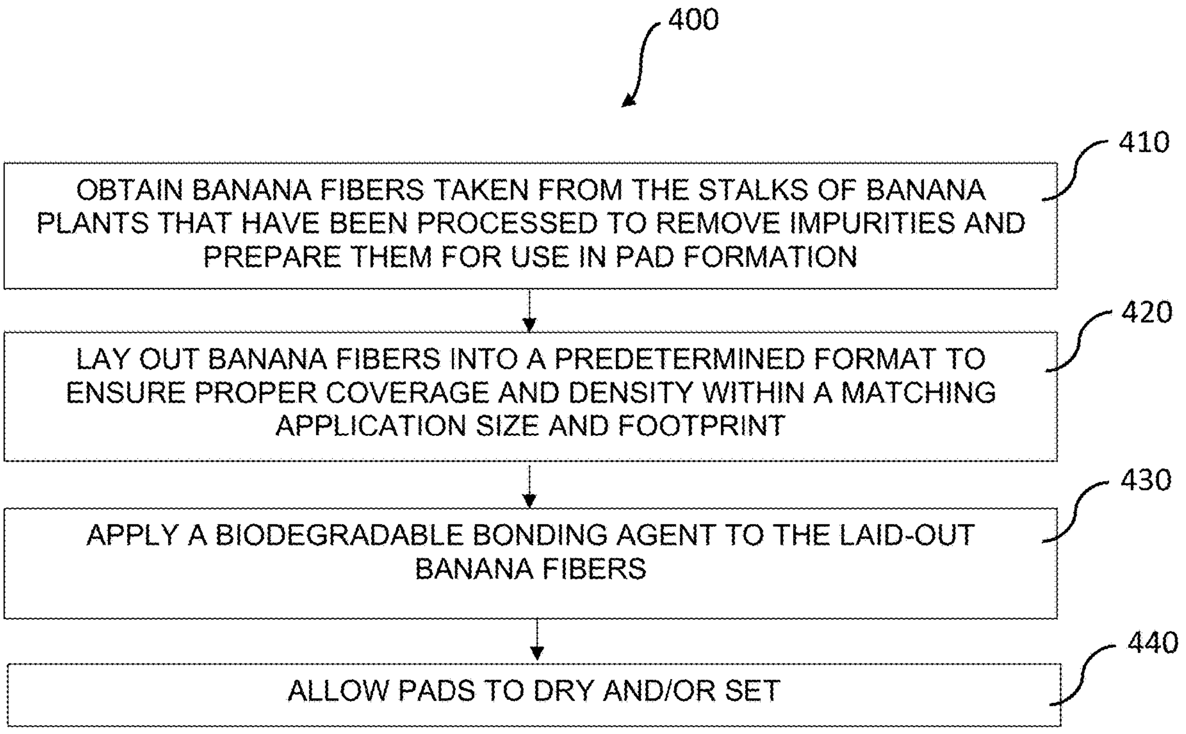
Referring to FIG. 4, illustrated is a flow diagram for a process of making a banana fiber pad.

The manufacturing process can involve several steps to ensure the structural integrity and performance of the pads. Referring to FIG. 4, illustrated is a flow diagram 400 of steps that can be taken for manufacturing pads using banana fiber, in accordance with an embodiment. Firstly, as shown in block 410, banana fibers can be obtained from the stalks of banana plants and processed to remove impurities and prepare them for use in pad formation. Then, as shown in Block 420, these fibers can then laid out in a predetermined form or configuration (i.e., format), ensuring proper coverage and density within a matching application size and footprint (e.g., an animal bedding area, evaporative cooler panel, landscaping/ground are for erosion control). Next, as shown in Block 430, a biodegradable bonding agent can be applied to the laid-out fibers. The bonding agent serves to bind the fibers together, forming a cohesive structure that maintains its integrity even when subjected to moisture. The bonding agent can be carefully selected to ensure compatibility with the banana fibers and to prevent disintegration or degradation upon exposure to water. Once the bonding agent is applied, the pads are allowed to dry or set, as shown in Block 440, ensuring that the fibers and the bonding agent form a strong and durable composite material. After drying, the pads can be inspected for quality and consistency before being packaged for shipment to end-users.

Upon receiving the pads, consumers can, for example, easily install them in their animal bedding, where they effectively absorb water and facilitate airflow, thereby providing efficient and eco-friendly bedding.

Figure 5:
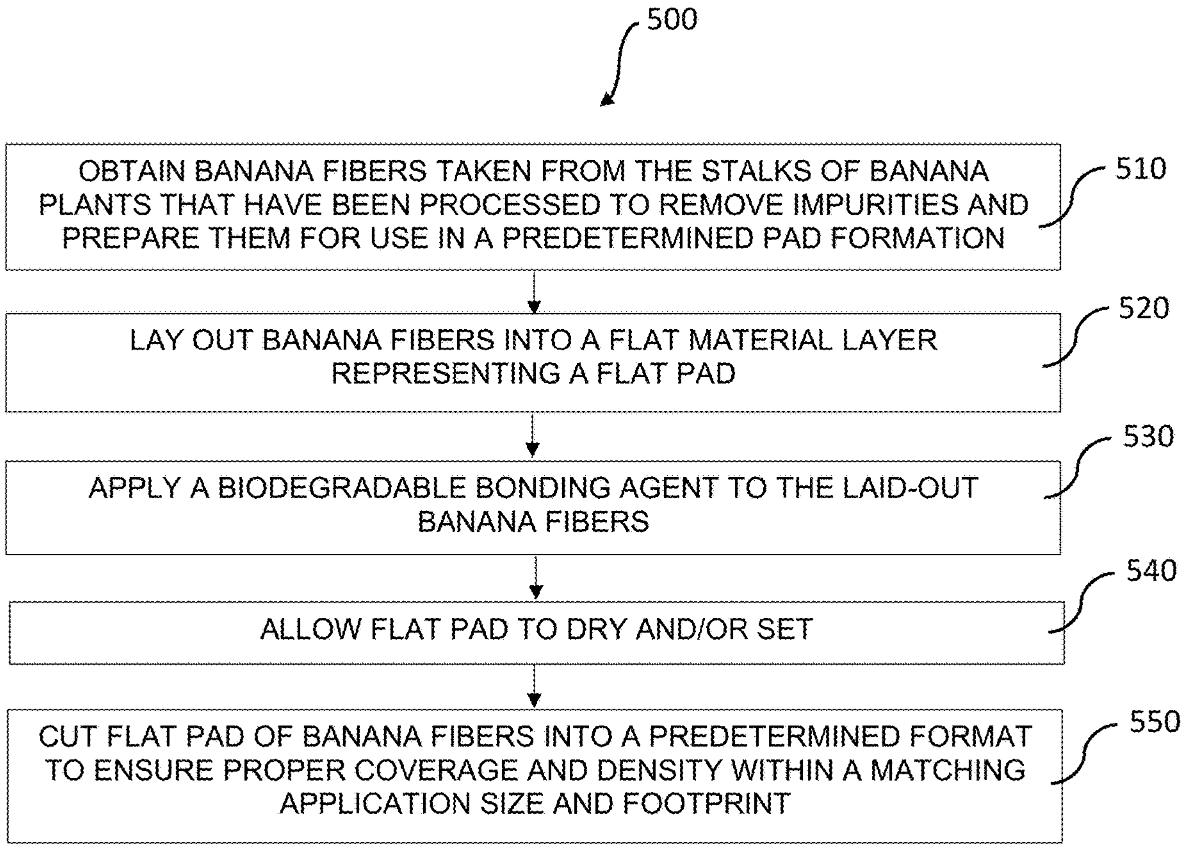
Referring to FIG. 5, illustrated is another flow diagram for a process of making a banana fiber pad; and Referring to FIG. 6, illustrated is a flow diagram of pretreatment and construction process, including industrial drying and optional stitching method; and Referring to FIG. 7, illustrated is a Cross-sectional view of a finished pad showing fiber orientation and binder or thread placement; and Referring to FIG. 8, illustrated is a graph of bacterial growth comparison: untreated vs. treated fibers.

Referring to FIG. 5, illustrated is another flow diagram of a method of manufacturing a banana fiber pad, in accordance with an embodiment. Referring to Block 510, banana fibers taken from the stalks of banana plants that have been processed to remove impurities can be obtained and prepared for use in creating a predetermined pad formation. As shown in Block 520, banana fibers can be laid out into a flat material layer representing a flat pad. Then, as show Block 530, a biodegradable bonding agent can be applied to the laid-out banana fibers. As shown in Block 540, the flat pad can then be allowed to dry and/or set. Finally, as shown in Block 550, the flat pad of banana fibers can be cut into a predetermined format to ensure proper coverage and density within a matching application size and footprint.

Figure 6:
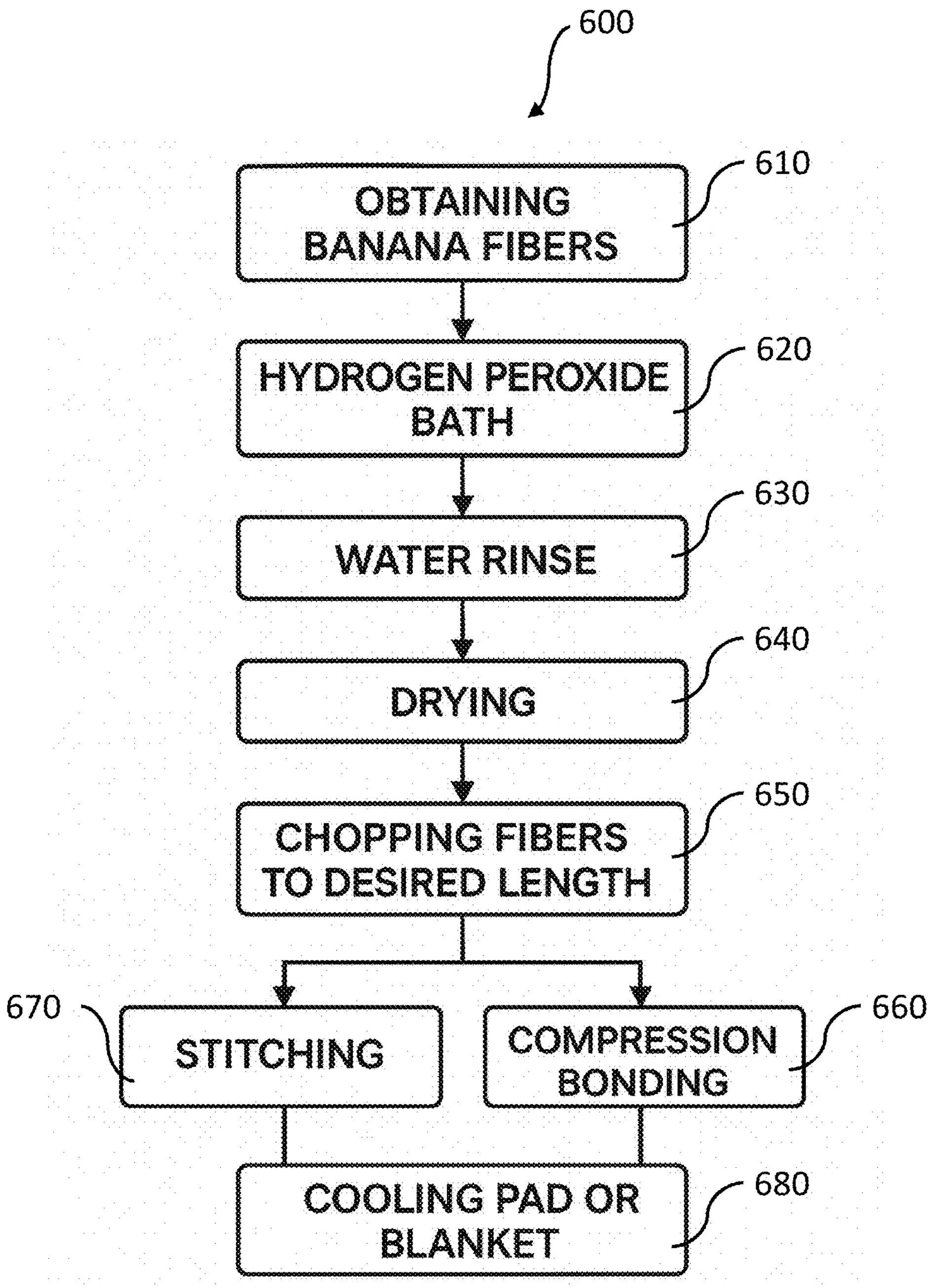

Referring to FIG. 6, illustrated is yet another flow diagram 600 providing alternative steps for fiber processing, in accordance with an embodiment. As shown in Block 610, fibers are obtained for processing. The fibers can then be soaked in a hydrogen peroxide bath, as show in Block 620. Afterwards, the fibers can be rinsed in/with water as shown in Block 630. As shown in Block 640, the fibers are then dried. Then as shown in Block 650, the fivers can be chopped into a desired length or size. Then the fibers can be assembled together by either using a bonding agent as shown in Block 660, or by stitching the fibers as shown in Block 670. Once assembled into a sheet, the fibers now in sheet form can be formatted (e.g., cut, shaped) into an appropriate size needed for its application (e.g., animal bedding, evaporative cooler pad, landscaping, erosion control), as shown in Block 680.

Further manufacturing processes that can be utilized to produce pads from banana fibers can also include the following detailed steps:

Raw Material Preparation

Obtain banana fibers from banana plant stalks. This can involve harvesting mature banana plants, removing the outer layers, and extracting the fibers.

Clean the banana fibers to remove impurities, dirt, and other contaminants. This can be achieved through washing and drying processes.

Fiber Processing

Optionally, the banana fibers can undergo additional processing steps such as cutting or shredding to achieve uniform length and thickness.

The processed fibers are then arranged in a predetermined form or configuration. This can involve layering the fibers to achieve the desired thickness and density for the pads.

Bonding Agent Application

Prepare the chosen biodegradable bonding agent according to manufacturer guidelines or formulation protocols.

Apply the bonding agent evenly over the arranged banana fibers. This can be done using techniques such as spraying, brushing, or dipping.

Ensure thorough coverage of the fibers with the bonding agent to promote strong adhesion and cohesion in the final pads.

Drying and Curing

Allow the bonding agent-coated banana fiber pads to dry and cure. This can be achieved through natural air drying or using controlled drying equipment.

Ensure adequate drying time to allow the bonding agent to fully set and cure, forming a strong and durable bond between the fibers.

Monitor temperature and humidity conditions during the drying process to prevent over-drying or moisture retention.

Quality Control and Inspection

Inspect the dried cooler pads for quality assurance. This can involve visual inspection for uniformity, integrity, and absence of defects.

Perform physical tests, such as tensile strength and flexibility tests, to assess the mechanical properties of the pads.

Reject any pads that do not meet quality standards and reprocess or discard them accordingly.

Packaging and Storage

Once the pads pass quality control checks, package them in suitable packaging materials for protection during storage and transportation.

Label the packages with relevant product information, including material composition, dimensions, and usage instructions.

Store the packaged cooler pads in a dry and controlled environment to prevent moisture absorption or degradation before use.

Distribution and Use

Distribute the packaged cooler pads to retailers, wholesalers, or end-users as per distribution channels.

Provide instructions for proper installation and use of the pads in animal bedding areas.

Monitor customer feedback and satisfaction to identify any potential improvements or adjustments to the manufacturing process.

Other pretreatment and construction processes, including industrial drying and optional stitching methods, can include the following:

1. Pretreatment Process of Banana Fiber

The banana fiber can be undergo a proprietary multi-stage pretreatment process prior to integration into the pad matrix:

a. Initial Rinsing and Sorting

Raw banana fibers can be mechanically separated and rinsed with clean water to remove surface debris.

Fibers can be sorted to remove pieces with excessive pith or contaminants.

b. Tannin Reduction Soak

Fibers can be soaked in a mild acidic or enzymatic solution to leach excess tannins.

pH-adjusted water (citric acid or vinegar bath) or natural enzymatic agents (e.g., pectinase) can be used.

Soak duration ranges from 6 to 24 hours depending on fiber density.

c. Microbial Stabilization

A probiotic bacterial rinse or enzyme wash can be applied to inhibit microbial growth during storage and use.

Alternatively, UV or heat sterilization may be applied.

d. Industrial Drying

Due to high water retention in banana fiber, drying can be performed using an industrial dryer capable of consistent heat and airflow.

This step can ensure rapid moisture reduction and uniform drying, targeting a moisture content below 12%.

Another manufacturing processes that can be utilized to produce pads from banana fibers can also include the following detailed steps:

2. Construction Methods for the Pad

Two distinct methods may be used to form the final pad:

a. Natural Binding Agent Application

Binder Composition: The binding agent can be derived from naturally sourced materials and is free of synthetic polymers.

Binder Application: The binder can be sprayed or coated onto layered banana fibers, then pressed and allowed to cure at 30-50° C.

Curing Result: Creates a semi-rigid matrix that maintains water absorption, air permeability, and dimensional stability.

b. Manual Stitching With Natural Thread

An alternative method involves stitching pretreated banana fibers together using natural thread such as jute, cotton or banana.

This method allows for flexibility in shape and assembly, particularly for large-format or agricultural pad installation and applications.

The resulting product retains biodegradability and sustainability goals while enabling modular production techniques.

Figure 7:
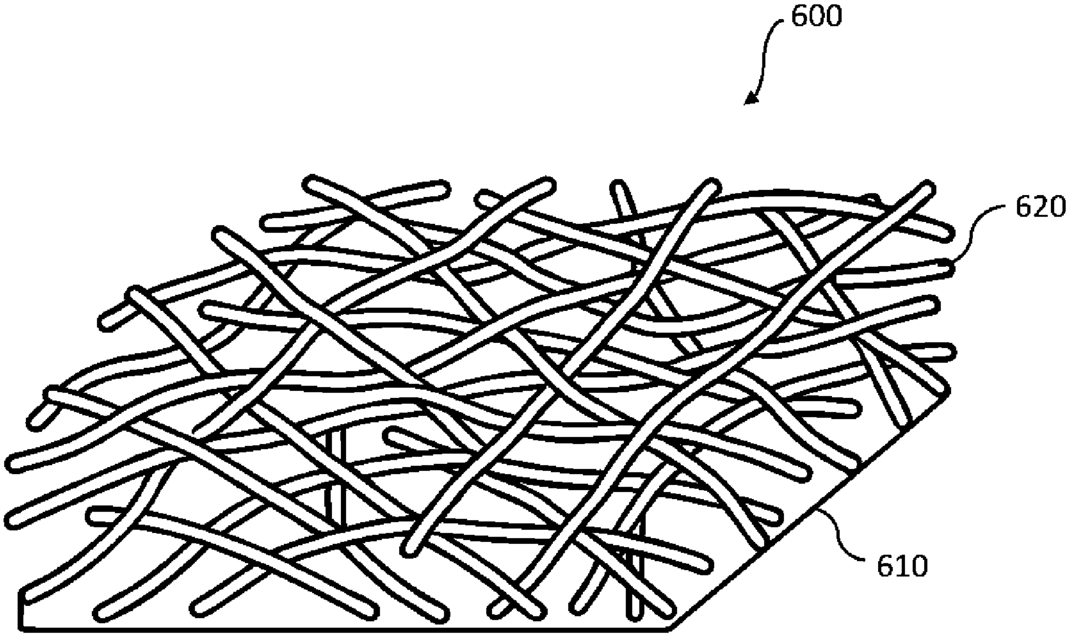

Referring to FIG. 7, illustrated is a Cross-sectional view and example of a finished cooling pad 700 showing fiber 710 orientation and binder or thread placement 720.

Figure 8:
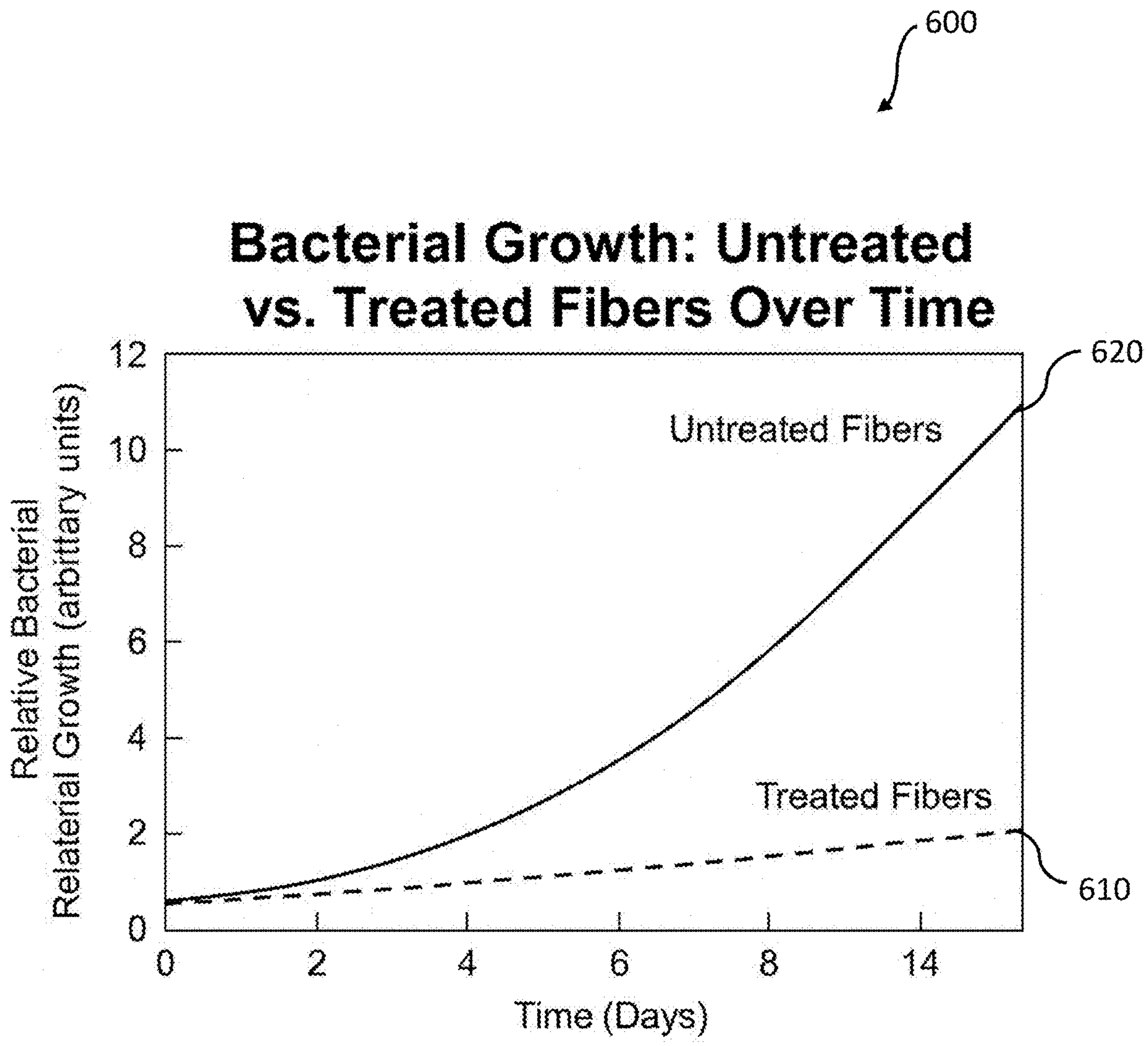

Referring to FIG. 8, illustrated is a graph 800 of bacterial growth comparison: untreated 820 vs. treated 810 fibers. As can be seen from the graph, treated fibers 810 experience less bacterial growth than untreated fibers 820.

By following the detailed manufacturing processes described above, it is possible to produce high-quality pads from banana fibers that meet performance, sustainability, and durability requirements.

Banana fiber used as bedding offer distinct advantages over existing animal bedding technologies, setting them apart as a unique and valuable innovation. These advantages include improved absorbency, durability, energy efficiency, and environmental sustainability compared to conventional materials used in animal bedding media. By emphasizing the distinctive features and benefits of banana fiber bedding material, we can establish its unique value proposition and the competitive advantage it offers in the marketplace.

The invention of banana fiber pads is novel, non-obvious, and distinct due to its use of a previously unexplored material for this application, the creative combination of elements to address specific challenges, and the unique advantages it offers over existing technologies.

Introducing a new animal bedding made from banana fibers presents several significant advantages and solves several problems compared to traditional bedding material.

Utilizing renewable banana fiber as a primary material, reduces reliance on non-renewable resources. Banana fiber pads contribute to environmental sustainability by utilizing banana crop waste. Banana fibers are sourced from crop waste, and they can provide a solution that reduces reliance on traditional materials like aspen fibers, which require the cutting down of trees. This approach helps to conserve forests and reduces the environmental impact associated with deforestation.

The pads and bonding agent can be biodegradable, minimizing environmental impact and promoting eco-friendly practices.

Banana fibers are highly absorbent and durable, increasing the efficiency of, for example, animal bedding. This means they can absorb and retain more water, enhancing keeping animals dry. Additionally, banana fibers can have a longer lifespan than traditional materials, reducing the frequency of replacement and overall resource consumption. Banana fiber pads are so absorbent that their use can require less material to provide equal or better bedding than is currently in use.

Recycling crop waste material like banana fibers for pads used for animal bedding, and in, inter alia, applications such as evaporative coolers, for landscaping, for control soil erosion, can lead to cost savings compared to using traditional materials. Since banana fibers are a byproduct of existing agricultural processes, they can be more readily available and less expensive to procure than materials sourced from trees.

Utilizing banana fibers for the creation of pads can have positive social implications by creating opportunities for farmers and communities involved in banana cultivation. It can provide an additional source of income and contribute to the utilization of agricultural waste, promoting economic and social development in banana-producing regions.

Banana fibers, being highly absorbent, can enhance airflow and keeping animals dry compared to traditional materials. This improvement in performance can lead to more effective cooling in hot and dry climates, providing better comfort. The bonding agent ensures that the pads remain intact and functional even when exposed to water, prolonging their lifespan and effectiveness.

Major and Immediate Applications beyond animal bedding: The banana fiber pad can be used as a replacement for traditional evaporative cooling pads in various industries such as data centers, commercial buildings, agricultural facilities, and industrial processes. Its primary function is to provide efficient and sustainable cooling while reducing energy consumption and environmental impact. The concept of this pad can serve as a base for new pads that collect carbon in Direct Air Capture (DAC) Facilities can also be explored as a use of banana fiber. Pads can be used to control surface erosion. Pads can be used in landscaping to promote moisture retention in underlying soil.

Overall, the embodiments describing use of a banana fiber pad has broad potential applications and may attract interest from a range of companies, organizations, and individuals looking to leverage its benefits for sustainable cooling solutions.

Pads made from banana fibers are ideal for because they possess certain properties that may contribute to reducing the growth of harmful organisms, although they may not provide complete protection on their own. Here are some ways in which banana fibers could potentially inhibit the growth of harmful organisms:

1. Antimicrobial Properties: Some natural fibers, including banana fibers, contain antimicrobial compounds that can inhibit the growth of bacteria, fungi, and other microorganisms. These compounds may help create an environment less conducive to microbial growth.
2. Moisture Regulation: Banana fibers have moisture-wicking properties, which can help keep surfaces dry by absorbing excess moisture. Since many harmful organisms thrive in moist environments, maintaining dry conditions can hinder their growth and proliferation.
3. Biodegradability: Banana fibers are biodegradable, meaning they break down naturally over time. This property can prevent the accumulation of organic matter, which could serve as a breeding ground for harmful organisms.
4. Chemical Composition: The chemical composition of banana fibers, including the presence of lignin, cellulose, and other compounds, may contribute to their resistance to microbial degradation.

While banana fibers may offer some degree of protection against harmful organisms, it's essential to note that their effectiveness may vary depending on factors such as fiber treatment, environmental conditions, and the specific types of organisms involved. Additionally, for applications where microbial resistance is critical, supplementary measures such as antimicrobial treatments or coatings may be necessary to enhance protection.

The invention claimed is:

1. Animal bedding, comprising:

a plurality of banana fibers derived from stalks of banana plants;

wherein the banana fibers are processed to remove impurities and are pretreated to reduce microbial growth and tannin content; and a biodegradable bonding agent applied to the banana fibers;

wherein the bonding agent binds the fibers into a cohesive structure configured to maintain structural integrity when exposed to moisture and to form a pad.

2. The animal bedding of claim 1, wherein the bonding agent is selected from natural starches, gums, resins, or proteins.

3. The animal bedding of claim 1, wherein a pad is formed into a rectangular or square shape for use in standardized animal enclosures.

4. The animal bedding of claim 1, wherein the banana fibers are sun-dried prior to bonding.

5. The animal bedding of claim 1, wherein the bonding agent maintains compatibility with banana fibers under humid or wet conditions.

6. The animal bedding of claim 1, wherein the banana fibers are cut into a predetermined format to ensure proper coverage and density within a matching application size and footprint.

7. The bedding of claim 1, wherein the pretreatment comprises hydrogen peroxide treatment followed by rinsing and drying.

8. An animal bedding pad, comprising:

a plurality of banana fibers laid out in a predetermined configuration corresponding to an application-specific size and footprint;

wherein the banana fibers are stitched together using natural thread to form a structurally integrated pad;

wherein the banana fibers are pretreated to reduce microbial growth and tannin content; and wherein the pad is biodegradable and provides moisture absorbency, cushioning, and odor resistance.

9. The animal bedding pad of claim 8, wherein the stitching is performed using cotton, hemp, or jute thread.

10. The animal bedding pad of claim 8, wherein the banana fibers are manually aligned before stitching.

11. The animal bedding pad of claim 8, wherein the pad includes multiple stitched layers for added durability and cushioning.

12. The animal bedding pad of claim 8, wherein the stitched configuration enhances airflow throughout the pad.

13. The bedding of claim 8, wherein the pretreatment comprises hydrogen peroxide treatment followed by rinsing and drying.

14. A method for manufacturing an animal bedding pad, comprising:

obtaining banana fibers from stalks of banana plants;

processing the banana fibers to remove impurities;

pretreating the banana fibers to reduce microbial growth and tannin content;

laying the banana fibers in a predetermined configuration to match an application-specific footprint;

stitching or applying a biodegradable bonding agent to the laid-out banana fibers;

drying the bonded banana fibers to form a durable and moisture-resistant animal bedding pad.

15. The method of claim 14, wherein the biodegradable bonding agent is applied in a sprayed, brushed, or dipped format.

16. The method of claim 14, wherein the drying step is performed via air-drying or solar drying.

17. The method of claim 14, wherein the banana fiber pad is inspected for fiber density and bonding strength prior to packaging.

18. The method of claim 14, wherein the banana fibers are sourced from agricultural waste material that would otherwise be discarded.

19. The bedding of claim 14, wherein the pretreatment comprises hydrogen peroxide treatment followed by rinsing and drying.

* * * * *